US005687564A

United States Patent [19]
Kelly et al.

[11] Patent Number: 5,687,564
[45] Date of Patent: Nov. 18, 1997

[54] LOW ROTOR VIBRATION AVOIDANCE IN AIRCRAFT GAS TURBINE ENGINES

[75] Inventors: James B. Kelly, Lake Worth; Kenneth D. Olson, Royal Palm Beach; Johnny B. Davis, Jupiter; Gerald Bracci, Tequesta, all of Fla.

[73] Assignee: United Technologies Corporation, Hartford, Conn.

[21] Appl. No.: 566,846

[22] Filed: Dec. 4, 1995

[51] Int. Cl.$^6$ ........................................ F02K 1/15
[52] U.S. Cl. .............................. 60/235; 60/242
[58] Field of Search ...................... 60/223, 235, 236, 60/237, 239, 242

[56]         References Cited
          U.S. PATENT DOCUMENTS 2,873,576  2/1959  Lombard ......................... 60/236
2,918,790  12/1959 Schoch ........................... 60/239
2,955,412  10/1960 Rhodes ........................... 60/242
4,159,625   7/1979 Kerr .............................. 60/236

Primary Examiner—Louis J. Casaregola
Attorney, Agent, or Firm—Robert E. Greenstien

[57]         ABSTRACT

Corrected fan speed (N1C2) and engine pressure ratio (EPR) are controlled, by controlling exhaust nozzle area (EA) according to a schedule or map so that as altitude increases (P2 decreases) the axial forces on the low rotor are sufficient to minimize low rotor vibrations. The altitude band (critical load region) is determined that produces loading levels in which vibrations appear. As this band is approached, conventional control of N1C2 and EPR is automatically overridden. N1C2 is decreased with altitude and exhaust area is reduced, thereby increasing the axial force (load) on the low rotor. When the upper limit of the band is reached, conventional control of N1C2 and EPR is automatically resumed, resulting in crossing the critical load region rapidly over a narrow altitude band.

4 Claims, 4 Drawing Sheets

LOW ROTOR VIBRATION AVOIDANCE IN AIRCRAFT GAS TURBINE ENGINES

TECHNICAL FIELD

This invention relates to aircraft gas turbine engines, in particular, low pressure rotor vibration avoidance.

BACKGROUND OF THE INVENTION

Under certain conditions vibrations can be produced in the low rotor system of a turbo fan gas turbine engine. These vibrations can produce mechanical damage to the engine and distract the pilot. One condition for these vibrations appears to be related to the total axial force (pressure) on the low pressure rotor system from the low speed fan and the low pressure turbine, which are related to ambient pressure on the fan and engine pressure ratio, as well as rotor speed. The vibrations tend to occur within certain altitude bands, when the total axial forces on the low pressure rotor system are reduced significantly.

DISCLOSURE OF THE INVENTION

An object of the present invention is to avoid low pressure rotor vibrations.

According to the invention, pressures on the low pressure rotor system are managed as a function of engine altitude to ensure that there is adequate axial force to avoid vibration.

According to the invention, corrected fan speed (N1C2) and engine pressure ratio (EPR) are adjusted by controlling exhaust nozzle area (EA) and fuel flow (WF) according to a schedule or map so that as altitude increases (P2 decreases) the axial forces are sufficient to avoid low pressure rotor vibrations.

According to invention, the altitude band (critical load region) is determined that produces loading levels in which vibrations appear. As this band is approached from lower altitudes, conventional control of N1C2 and EPR is automatically over-ridden. N1C2 is decreased with altitude and exhaust area is reduced, thereby increasing the axial force (load) on the low pressure rotor. When the upper limit of the band is reached, conventional control of N1C2 and EPR is automatically resumed, resulting in crossing the critical load region rapidly over a narrow altitude band.

A feature of the invention, it "snaps" the engine through the critical load region. To the pilot, the engine rapidly transitions through the critical load region because the invention substantially reduces the altitude range over which it can be present. In a rapidly ascending or descending aircraft, the critical region is not even noticed.

Another feature of the the invention is that it is basically an open loop vibration avoidance scheme in which the critical load region is avoided for which high vibation response can occur on some engines.

Other objects, benefits and features of the invention will be apparent from the following discussion of one or more embodiments.

BEST MODE FOR CARRYING OUT THE INVENTION

Figure 1:
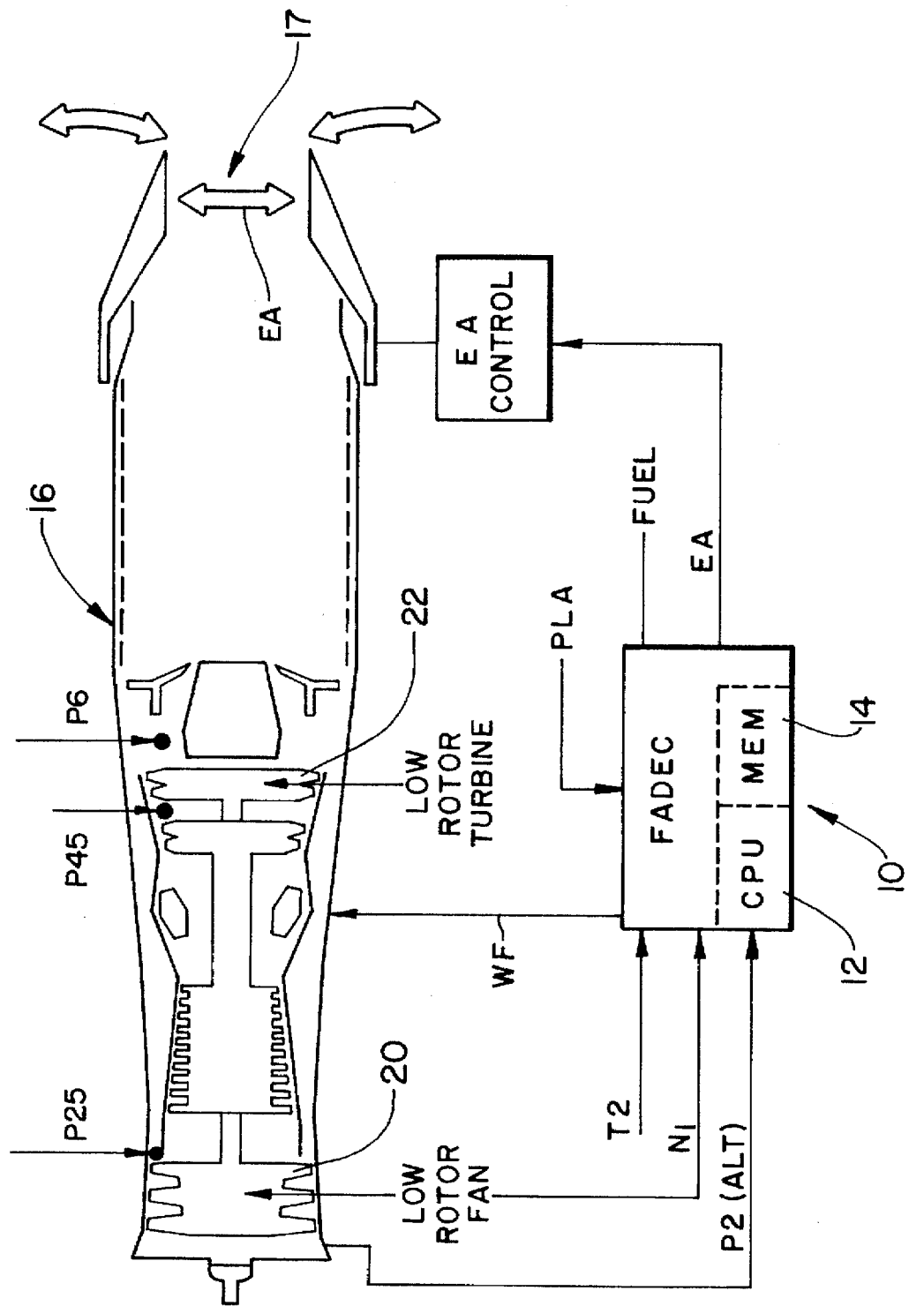
FIG. 1 is a block diagram showing an aircraft engine and a full authority digital electronic fuel control (FADEC) for controlling engine operation according to the invention.
Figure 3:
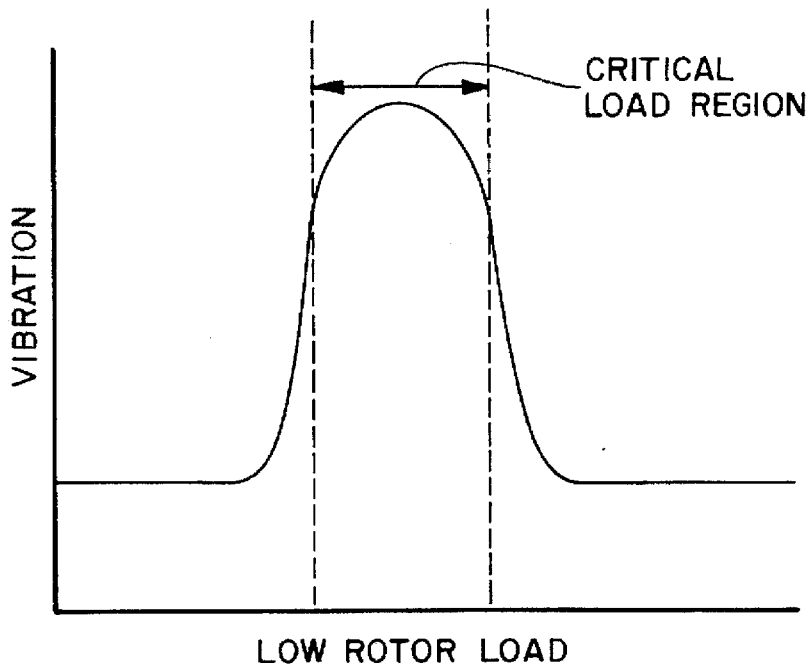
FIG. 3 is a graph of the low pressure rotor load vs. low pressure rotor vibration response, showing the critical load region in which vibration response is especially high.

The aircraft gas turbine propulsion system shown in FIG. 1 uses an electronic fuel control 10, which contains a signal processor or CPU 12 to perform signal processing routines, stored in a memory unit MEM 14, to control fuel flow WF to the engine in response to PLA (power lever advance or commanded thrust) and various engine operating signals, such as pressures P2, P6, fan speed N1 and temperature T2. The gas turbine engine 16 includes a variable area exhaust nozzle 17, controlled by an EA control 18 to control the exhaust area EA. The low rotor system fundamentally comprises the low pressure rotor fan 20 and the low pressure rotor turbine 22. The loading on this system in the axial direction determines its susceptibility to vibrations, and this can be expressed by the following relationships (equation 1, where $A_F$ is the effective area of the fan and $A_T$ is the effective area of the turbine. FIG. 3 shows the vibration response to low pressure rotor load and shows the locus of the critical load region for which high vibration occurs.

$$\text{Low Rotor Load} = (P25 - P2)A_F - (P45 - P6)A_T \quad \text{Equation (1)}$$

or $$\frac{\text{Load}}{P2} = \left(\frac{P25}{P2} - 1\right)A_F - \left(\frac{P45}{P2} - \frac{P6}{P2}\right)A_T$$

Figure 5:
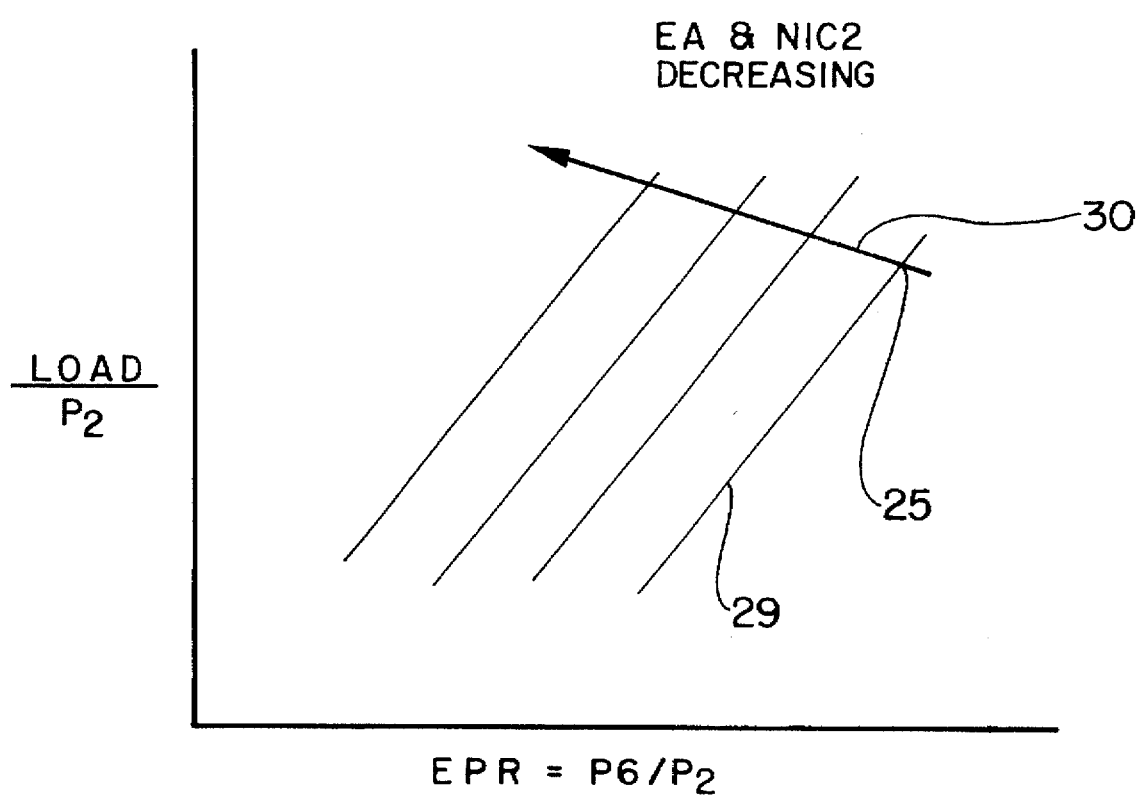
FIG. 5 is a graphic illustration of a map or schedule for corrected low pressure rotor load divided by P2 as a function of EPR and N1C2 used by the fuel control to control low pressure rotor load according the present invention.

The term P6/P2 represents the exhaust gas pressure ratio or "EPR", which can be controlled by adjusting the exhaust nozzle are EA. The P25/P2 and P45/P2 parameters are functions of P6/P2 for a given N1C2 The equation illustrates that if EPR is constant, the load will decrease with altitude (decreasing P2), creating an environment for low pressure rotor vibrations. FIG. 5 graphically illustrates the relationship between Load/P2, N1C2 and EPR.

Figure 4:
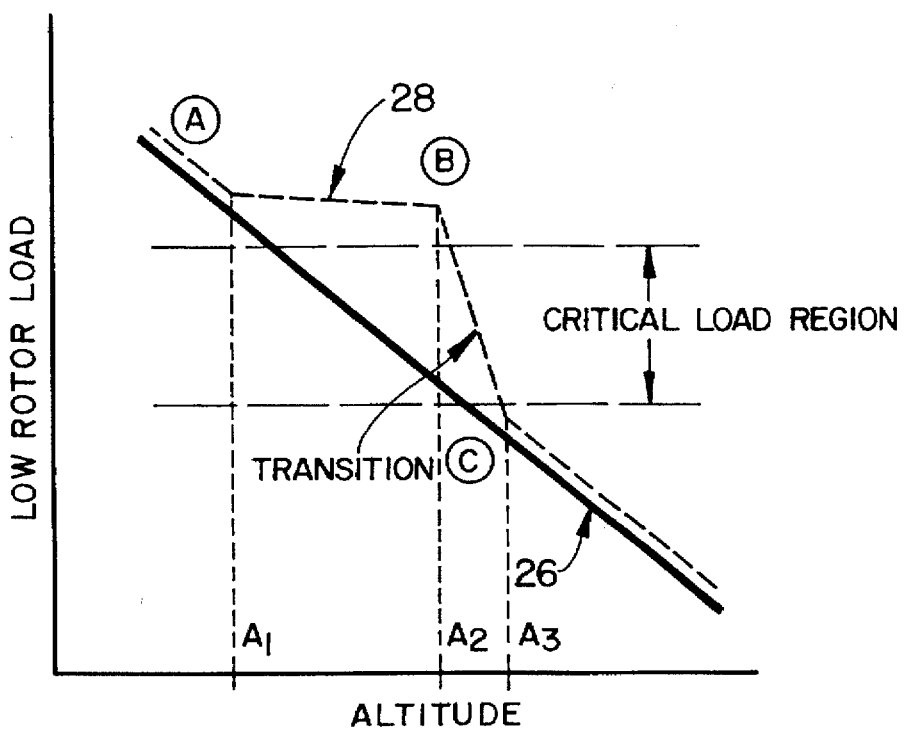
FIG. 4 is a graph of altitude vs. low pressure rotor load and demonstrates the change in low pressure rotor loading using the present invention.

The present invention manages low rotor load, to avoid vibration, by adjusting EPR in relation to altitude (P2) and, additionally, N1C2 in order maintain adequate engine thrust. This is accomplished by storing in the MEM the map or schedule shown in FIG. 5, either as a look-up table or formulae that define the various speed operating lines. From FIG. 5, it can be observed there is a defined EPR value for a particular N1C2 and a desired load pressure ratio (Load/P2). Following conventional teaching, EPR and N1C2 are set to provide required thrust, fuel control and stall margin and other factors, but not low rotor load. (In fact, the match of N1C2 and EPR is generally constant, e.g., at point 25 for the subsonic flight regime in which low loads/high vibrations can occur.) Line 26 in FIG. 4 illustrates that as altitude increases, the conventional engine control approach (maintain constant EPR and N1C2) produces steadily lower low pressure rotor loading, as would expected from equation 1. At a certain loading level, the "critical load region" is approached, a region most conductive to low rotor vibrations. According to the invention, however, EPR is controlled along with N1C2 to produce the low rotor load line 28. Starting at point A, this line tracks the conventional line 26 but when altitude A1 is approached, where the upper limit of the critical load region begins, the line 28 in FIG. 4 starts to maintain an increased low pressure rotor load to point B. At point B, approximately at altitude A2, the upper limits of the critical load region, the low pressure rotor load is rapidly reduced to point C as the aircraft altitude changes from A2 to A3 (less than the maximum engine operating or service altitude). The conventional line 26 is once again tracked from point C, as the conventional control regimen is resumed.

Figure 2:
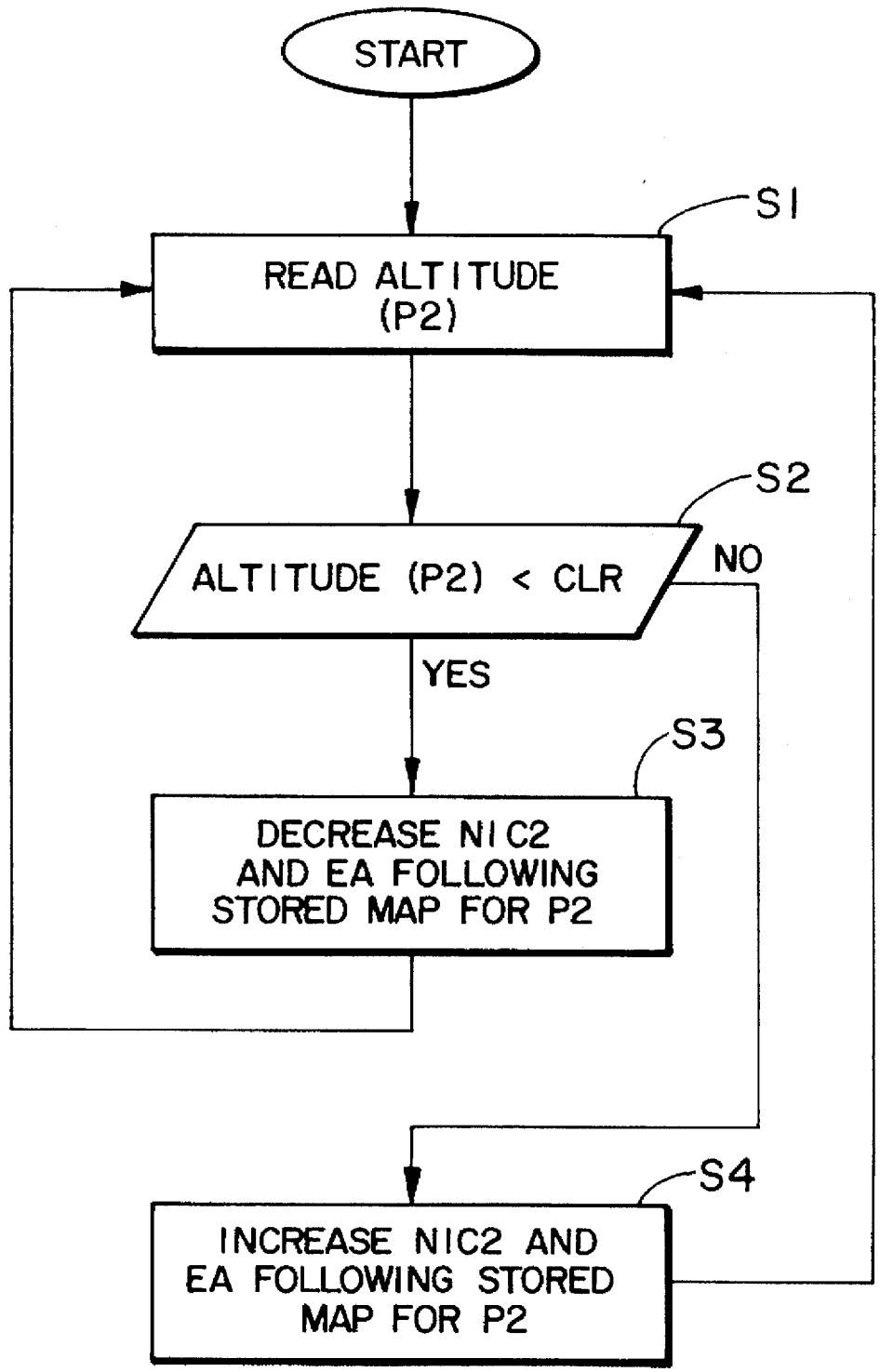
FIG. 2 is a flow chart showing a signal processing routine for controlling low rotor vibration according to the present invention.

During flight, the system in FIG. 1, would constantly read P2 and control N1C2 and EPR following the map in FIG. 5. The routine in FIG. 2, however, would be implemented when the altitude A1 is sensed, permitting the FADEC to depart from conventional scheduling of N1C2 and EPR as the cortical load region is approached. In step S1 of FIG. 2, the altitude is read, it being assumed this it is at least A1 but not A2. This produces a positive answer to the test at step S2, moving the routine to step S3, where N1C2 is decreased and exhaust area EA is decreased (EPR is increased) according the line 30 in FIG. 5. Between altitudes A1 and A2 this process continues, N1C2 is decreased and EPR is increased. Eventually, test S2 produces a negative answer, meaning the altitude is greater that A2. The resulting negative answer at step S2 leads to step S4, where N1C2 is increased and EPR is decreased in a narrow band of altitude (A2–A3), so as to return the control to the normal operating line 26, e.g., using the speed line 29 in FIG. 5. Thus, the load management avoids of the critical load/high vibration operating region.

With the benefit of the previous discussion of the invention, one of ordinary skill in the art may be able to modify the invention in whole or in part without departing from the true scope and spirit of the invention.

We claim:

1. A gas turbine engine having a low pressure rotor system characterized by:

means for providing a first plurality of altitude signals below a first engine operating altitude and a second plurality of altitude signals above said first altitude;

means for controlling engine exhaust pressure in response to an exhaust area signal;

signal processing means for providing said exhaust area signal and for controlling low pressure rotor speed, said signal processing means comprising means for storing a first schedule for providing said exhaust area signal to increase engine exhaust pressure with altitude in response to said first plurality of altitude signals and to decrease engine exhaust pressure with altitude in response to said second plurality of altitude signals; and for storing a second schedule for decreasing low pressure rotor speed with altitude in response to said first plurality of altitude signals and increase low pressure rotor speed with altitude in response to said second plurality of altitude signals.

2. An aircraft gas turbine engine comprising a fuel control for performing an engine control function of increasing fan speed with altitude and decreasing engine exhaust pressure ratio with altitude, characterized in that said fuel control comprises:

vibration reduction means for augmenting said fuel control function by progressively decreasing fan speed and progressively increasing engine exhaust pressure ratio as an aircraft ascends from a first to a second altitude, said means being inactivated when the aircraft is above said second altitude.

3. The aircraft gas turbine engine described in claim 2, further characterized by a variable exhaust nozzle for adjusting engine exhaust pressure ratio in response to signals from said engine control function and said vibration reduction means.

4. A gas turbine engine characterized by:

means for adjusting total low rotor axial force by reducing low pressure rotor speed and increasing exhaust pressure progressively as the engine ascends to a first altitude that is less than a maximum service altitude for the engine, said means being inactivated above said first altitude.

* * * * *